(12) United States Patent
Tomori

(10) Patent No.: US 10,142,470 B2
(45) Date of Patent: Nov. 27, 2018

(54) ACD SYSTEM, INCOMING-CALL ORDER NOTIFICATION METHOD, AND NON-TRANSITORY COMPUTER READABLE MEDIUM

(71) Applicant: NEC Platforms, Ltd., Kawasaki-shi, Kanagawa (JP)

(72) Inventor: Akihito Tomori, Kanagawa (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 0 days.

(21) Appl. No.: 15/754,379

(22) PCT Filed: Jul. 27, 2016

(86) PCT No.: PCT/JP2016/003485
§ 371 (c)(1),
(2) Date: Feb. 22, 2018

(87) PCT Pub. No.: WO2017/043006
PCT Pub. Date: Mar. 16, 2017

(65) Prior Publication Data
US 2018/0249009 A1 Aug. 30, 2018

(30) Foreign Application Priority Data
Sep. 8, 2015 (JP) ................. 2015-176486

(51) Int. Cl.
*H04M 3/51* (2006.01)
*H04M 3/42* (2006.01)
*H04M 3/523* (2006.01)

(52) U.S. Cl.
CPC ....... *H04M 3/5133* (2013.01); *H04M 3/5183* (2013.01); *H04M 3/523* (2013.01)

(58) Field of Classification Search
CPC .......... H04M 3/42314; H04M 3/5133; H04M 3/5175; H04M 3/5183; H04M 3/523; H04M 3/5238
(Continued)

(56) References Cited

U.S. PATENT DOCUMENTS 5,465,286 A 11/1995 Clare et al.
5,557,668 A * 9/1996 Brady ............... H04M 3/42323
379/211.02
(Continued)

FOREIGN PATENT DOCUMENTS

CN 101166212 A 4/2008
CN 101610322 A 12/2009
(Continued)

OTHER PUBLICATIONS

Decision of Refusal for Japanese Patent Application No. 2015-176486 dated May 30, 2017.
(Continued)

Primary Examiner — Harry S Hong
(74) Attorney, Agent, or Firm — Sughrue Mion, PLLC

(57) ABSTRACT

In an ACD system according to the present disclosure, when an ACD apparatus having a function of automatically assigning incoming telephone calls for reception work to arbitrary reception-staff terminals receives a notification request for information about a distribution order of incoming telephone calls from a reception-staff terminal that is waiting for an incoming telephone call through a network, the ACD apparatus generates incoming-call distribution order information indicating the distribution order of incoming telephone calls for, among one or a plurality of reception-staff terminals, the reception-staff terminal that has made the request, transmits the incoming-call distribution order information to the reception-staff terminal that has
(Continued)

made the request through the network, displays the incoming-call distribution order information on a screen of the reception-staff terminal, and thereby notifies a reception staff member that has made the request of the incoming-call distribution order information.

7 Claims, 5 Drawing Sheets

(58) Field of Classification Search
    USPC .................................................. 379/265.11
    See application file for complete search history.

(56) References Cited

U.S. PATENT DOCUMENTS

| | | | | |
|---|---|---|---|---|
| 6,453,039 | B1* | 9/2002 | Cutting | H04M 3/523 |
| | | | | 379/265.11 |
| 7,295,669 | B1* | 11/2007 | Denton | H04M 3/51 |
| | | | | 379/265.02 |
| 2016/0182715 | A1* | 6/2016 | Rist | H04M 3/42323 |
| | | | | 379/211.02 |

FOREIGN PATENT DOCUMENTS

| | | |
|---|---|---|
| JP | 1-255363 A | 10/1989 |
| JP | 2001-313725 A | 11/2001 |
| JP | 2004-266611 A | 9/2004 |
| JP | 2005-204117 A | 7/2005 |
| JP | 2006-253905 A | 9/2006 |
| JP | 2008-048089 A | 2/2008 |
| JP | 2008-066825 A | 3/2008 |
| JP | 2008-109178 A | 5/2008 |

OTHER PUBLICATIONS

International Search Report for PCT/JP2016/003485 dated Sep. 20, 2016.

Communication dated Apr. 24, 2018, from the European Patent Office in counterpart application No. 16843879.4.

Communication dated Sep. 5, 2018 from the State Intellectual Property Office of the P.R.C. in counterpart Chinese application No. 201680051776.3.

* cited by examiner

ACD SYSTEM, INCOMING-CALL ORDER NOTIFICATION METHOD, AND NON-TRANSITORY COMPUTER READABLE MEDIUM

CROSS REFERENCE TO RELATED APPLICATIONS

This application is a National Stage of International Application No. PCT/JP2016/003485 filed Jul. 27, 2016, claiming priority based on Japanese Patent Application No. 2015-176486 filed Sep. 8, 2015, the contents of all of which are incorporated herein by reference in their entirety.

TECHNICAL FIELD

The present disclosure relates to an ACD (Auto Call Distribution) system, an incoming-call order notification method, and a non-transitory computer readable medium storing an incoming-call order notification program. An ACD system according to the present disclosure can be suitably applied in fields of various systems that are used to construct a call center, a user experience, a telephone reception window, and so on.

BACKGROUND ART

An ACD function that is provided in an electronic private branch exchange or in an apparatus included in an electronic private branch exchange in related art are widely used in a call center, a user experience, a telephone reception window, and so on in which telephone calls are received. For example, as disclosed in "ACD System" in Japanese Unexamined Patent Application Publication No. 2004-266611, which is referred to as Patent Literature 1, "Button Telephone Device and Its Overflow-call Informing Method" in Japanese Unexamined Patent Application Publication No. 2006-253905, which is referred to as Patent Literature 2, and so on, the ACD function provides a mechanism for distributing incoming calls according to receiving situations of reception staff members (e.g., operators) so that each reception staff member (e.g., each operator) undertakes an equal amount of a reception task.

CITATION LIST

Patent Literature

Patent Literature 1: Japanese Unexamined Patent Application Publication No. 2004-266611
Patent Literature 2: Japanese Unexamined Patent Application Publication No. 2006-253905

SUMMARY OF INVENTION

Technical Problem

For example, when such a related-art ACD function that is provided in an electronic private branch exchange or in an apparatus included in an electronic private branch exchange is used in a call center, a mechanism in which, for example, information about a situation of all the incoming telephone calls to the call center or about an order according to which telephone calls to the call center are connected to respective reception staff members in charge of reception of the telephone calls, is used as internal information in the ACD function or disclosed only to a supervisor who supervises the reception staff members is adopted.

Therefore, each of the reception staff members who are waiting for incoming telephone calls related to reception work cannot have knowledge about the distribution order of incoming calls in advance. Consequently, each of the plurality of reception staff members cannot predict when an incoming telephone call related to the reception work arrives at his/her telephone terminal. Accordingly, each of these reception staff members can recognize a timing at which his/her reception work starts only when an incoming call suddenly occurs in his/her telephone terminal. As described above, in the ACD function in related art, there is a feeling of unexpectedness in regard to incoming telephone calls, i.e., an incoming telephone call suddenly occurs in a telephone terminal of each reception staff member. Because of this feeling of unexpectedness in regard to incoming telephone calls, additional work related to the reception work for incoming telephone calls, such as a preliminary preparation, may be required. Further, when reception staff members need to carry out other work, burdens put on the reception staff members are large.

Therefore, for the purpose of improving the quality of reception work and to efficiently prepare for the reception work, it has been strongly desired by reception staff members that they should be able to easily recognize a distribution order of incoming calls, an approximate time before reception work occurs, and an overall busyness situation of a call center.

Object of Present Disclosure

The present disclosure has been made in view of the above-described circumstance and an object thereof is to provide an ACD system, an incoming-call order notification method, and a non-transitory computer readable medium storing an incoming-call order notification program capable of notifying each reception staff member of a cumulative situation of incoming telephone calls for reception work and/or a distribution order of incoming telephone calls in advance.

Solution to Problem

To solve the above-described problem, an ACD system, an incoming-call order notification method, and a non-transitory computer readable medium storing an incoming-call order notification program according to the present disclosure adopt the following characteristic configurations.

(1) An ACD system according to the present disclosure includes one or a plurality of reception-staff terminals used by one or a plurality of respective reception staff members each of whom receives an incoming telephone call for reception work, an ACD (Auto Call Distribution) apparatus configured to automatically assign the incoming telephone call to an arbitrary reception-staff terminal, and a network configured to connect each reception-staff terminal with the ACD apparatus, in which when the ACD apparatus receives a notification request for information about a distribution order of the incoming telephone call from the reception-staff terminal that is waiting for the incoming telephone call through the network, the ACD apparatus generates incoming-call distribution order information indicating an incoming-call order of the incoming telephone call for the reception-staff terminal that has made the notification request, and transmits the generated incoming-call distribution order information to the reception-staff terminal that has made the notification request through the network, and the reception-staff terminal that has made the notification request and received the incoming-call distribution order information displays the received incoming-call distribution order information on a screen of a display device.

(2) An incoming-call order notification method according to the present disclosure is an incoming-call order notification method used in an ACD system including one or a plurality of reception-staff terminals used by one or a plurality of respective reception staff members each of whom receives an incoming telephone call for reception work, an ACD (Auto Call Distribution) apparatus configured to automatically assign the incoming telephone call to an arbitrary reception-staff terminal, and a network configured to connect each reception-staff terminal with the ACD apparatus, the incoming-call order notification method being adopted to make the ACD apparatus notify the reception-staff terminal of an order in which the incoming telephone call is distributed to the reception-staff terminal, in which when a notification request for information about a distribution order of the incoming telephone call is sent from the reception-staff terminal that is waiting for the incoming telephone call to the ACD apparatus through the network, the ACD apparatus generates incoming-call distribution order information indicating an incoming-call order of the incoming telephone call for the reception-staff terminal that has sent the notification request, and transmits the generated incoming-call distribution order information to the reception-staff terminal that has sent the notification request through the network, and when the reception-staff terminal that has sent the notification request receives the incoming-call distribution order information, the reception-staff terminal displays the received incoming-call distribution order information on a screen of a display device and thereby notifies a reception staff member in charge of the reception-staff terminal of the incoming-call distribution order information.

(3) A non-transitory computer readable medium storing an incoming-call order notification program according to the present disclosure stores an incoming-call order notification program adapted to implement an incoming-call order notification method described in the above-shown item (2) as a computer executable program.

Advantageous Effects of Invention

An ACD system, an incoming-call order notification method, and an incoming-call order notification program according to the present disclosure can provide the following advantageous effect.

Since each reception staff member who is waiting for an incoming telephone call for reception work is notified of a distribution order of incoming telephone calls, each reception staff member can easily recognize the distribution order of incoming telephone calls and an approximate time before reception work occurs. Therefore, each reception staff member can preliminarily prepare for the reception work in a timely manner and improve quality of the reception work.

DESCRIPTION OF EMBODIMENT

Figure 1:
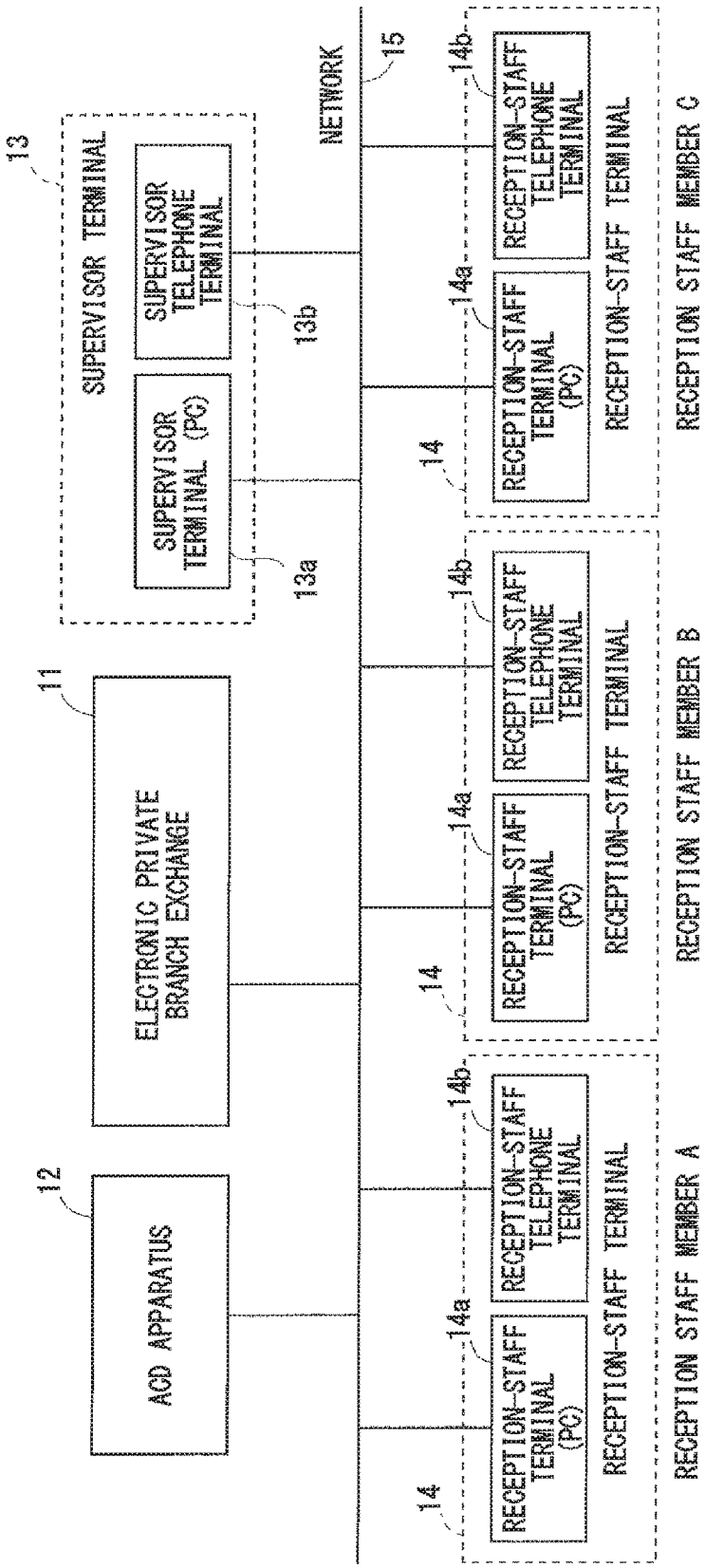
FIG. 1 is a system configuration diagram showing an embodiment of a system configuration of an ACD system according to the present disclosure.

Preferred embodiments of an ACD system, an incoming-call order notification method, and an incoming-call order notification program according to the present disclosure are explained hereinafter with reference to the accompanying drawings. Note that in the following explanation, an ACD system and an incoming-call order notification method according to the present application are explained. However, needless to say, the incoming-call order notification method may be implemented as a computer executable incoming-call order notification program. Alternatively, the incoming-call order notification program may be recorded in a computer readable recording medium. Further, reference symbols added to respective components in the drawings are added for the sake of convenience in order to facilitate understanding of the drawings. That is, needless to say, they are not added to limit the present disclosure to the embodiments shown in the drawings.

(Features of Present Disclosure)

Prior to explaining embodiments according to the present disclosure, outlines of features of the present disclosure are explained hereinafter. An ACD system according to the present disclosure includes, at least, one or a plurality of reception-staff terminals used by one or a plurality of respective reception staff members, and an ACD (Auto Call Distribution) apparatus. In this ACD system, when a notification request for information about a distribution order of incoming telephone calls is sent from a reception-staff terminal that is waiting for an incoming telephone call to the ACD apparatus, the ACD apparatus generates the information about the distribution order of incoming telephone calls as incoming-call distribution order information according to the notification request, transmits the generated information to the reception-staff terminal, and thereby displays the information in a display device of the reception-staff terminal. By displaying the incoming-call distribution order information in the display device as described above, each reception staff member is notified of the incoming-call distribution order information. This incoming-call distribution order information may include not only the information about the distribution order of incoming telephone calls but also information indicating a cumulative situation of incoming telephone calls. To put it differently, the reception-staff terminal that is waiting an incoming telephone call is not handling any incoming telephone call and is in a vacant state. That is, it is a reception-staff terminal that is waiting for an incoming telephone call to be distributed thereto.

Accordingly, each reception staff member in the ACD system can easily recognize an overall busyness situation of reception work, a distribution order of incoming telephone calls, and an approximate time before reception work occurs. Therefore, each reception staff member can preliminarily prepare for the reception work in a timely manner and improve quality of the reception work.

Note that the state in which there is a reception staff member who is waiting an incoming telephone call means a state in which the number of reception staff members is larger than the number of incoming telephone calls for reception work.

Embodiments According to Present Disclosure

Next, an embodiment of a system configuration of an ACD system according to the present disclosure is explained with reference to FIG. 1. FIG. 1 is a system configuration diagram showing an embodiment of a system configuration of an ACD system according to the present disclosure. The ACD system shown in FIG. 1 is constructed by connecting an electronic private branch exchange 11, an ACD apparatus 12, a supervisor terminal 13, and one or a plurality of reception-staff terminals 14 to each other through a network 15. The number of reception-staff terminals 14 is usually more than one. However, this embodiment can be implemented by using only one reception-staff terminal 14. The supervisor terminal 13 includes a PC (Personal Computer) terminal for a supervisor, i.e., a supervisor terminal (PC) 13a and a supervisor telephone terminal 13b, and is assigned to the supervisor. Further, each of the reception-staff terminals 14 includes a PC terminal for a reception staff member, i.e., a reception-staff terminal (PC) 14a and a reception-staff telephone terminal 14b, and one of the reception-staff terminals 14 is assigned to each one of reception staff members (a reception staff member A, a reception staff member B, and a reception staff member C).

Note that each of the supervisor terminal (PC) 13a and the reception-staff terminal (PC) 14a is an information terminal equipped with a data processing function (e.g., a PC (Personal Computer)). Further, each of the supervisor telephone terminal 13b and the reception-staff telephone terminal 14b is a telephone terminal equipped with a telephone-call sending/receiving function and a telephone conversation function. Although the ACD apparatus 12 is constructed as an apparatus independent of the electronic private branch exchange 11 in the system configuration diagram shown in FIG. 1, the ACD apparatus 12 may be disposed inside the electronic private branch exchange 11. Further, in the present disclosure, the supervisor terminal 13 may not be provided in some cases.

Figure 2:
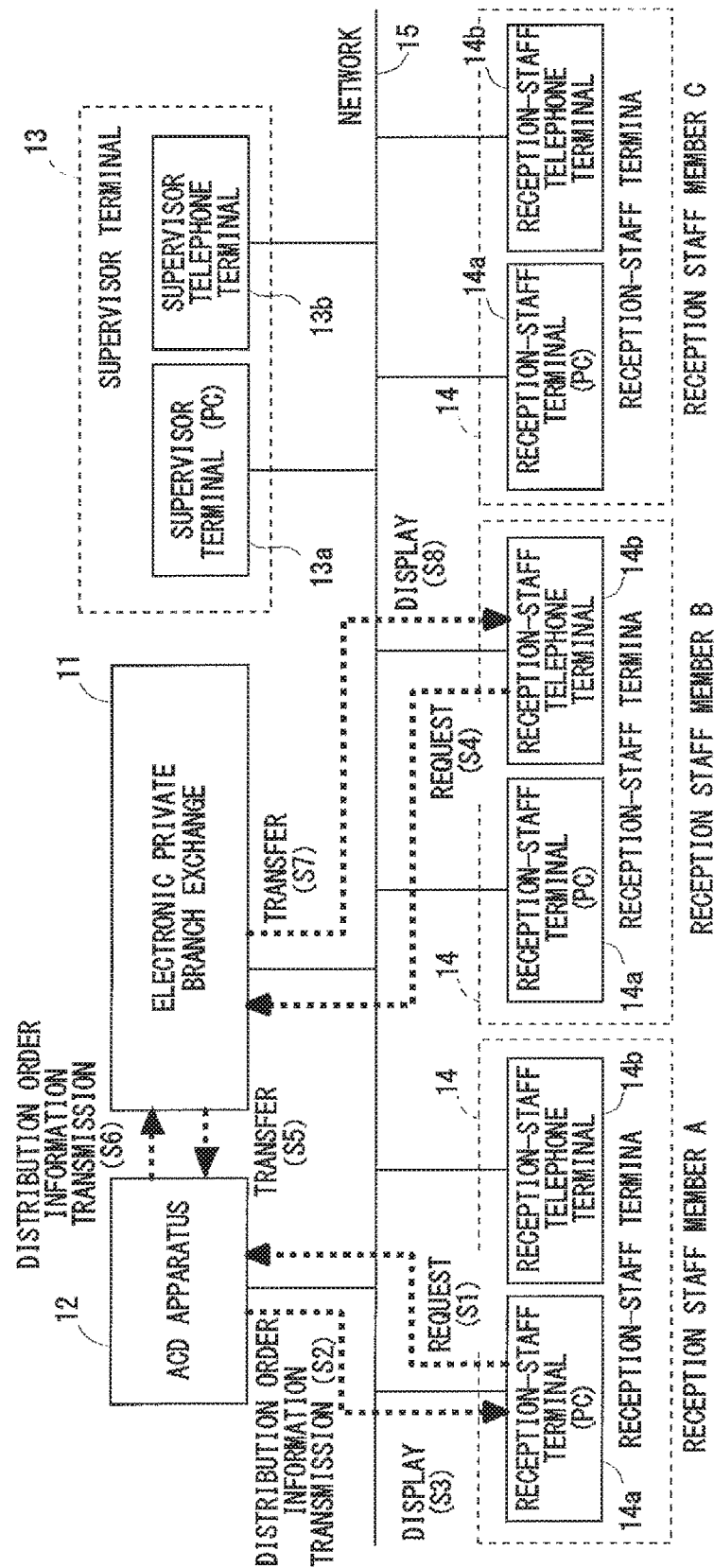
FIG. 2 is an explanatory diagram for explaining an example of flows of signals up to when a reception staff member who is waiting for an incoming telephone call recognizes a distribution order of incoming telephone calls in the ACD system shown in FIG. 1.

Next, flows of signals up to when a reception staff member who is waiting for an incoming telephone call recognizes a distribution order of an incoming telephone call to him/her are explained with reference to an explanatory diagram shown in FIG. 2. FIG. 2 is an explanatory diagram for explaining an example of flows of signals up to when a reception staff member who is waiting for an incoming telephone call recognizes a distribution order of incoming telephone calls in the ACD system shown in FIG. 1.

The explanatory diagram shown in FIG. 2 shows an example case in which a reception staff member A who is waiting for an incoming telephone call directly requests, through the network 15, the ACD apparatus 12 to notify the reception staff member A of a distribution order of incoming telephone calls by using the reception-staff terminal (PC) 14a of his/her reception-staff terminal 14, and a reception staff member B who is waiting for an incoming telephone call requests, through the network 15, the ACD apparatus 12 to notify the reception staff member B of a distribution order of incoming telephone calls through the electronic private branch exchange 11 by using the reception-staff telephone terminal 14b of his/her reception-staff terminal 14.

Firstly, when the reception staff member A starts up a support application for a notification request for an incoming telephone call order, which is installed in the reception-staff terminal (PC) 14a of his/her reception-staff terminal 14, by operating the reception-staff terminal (PC) 14a, the support application for the notification request installed in the reception-staff terminal (PC) 14a transmits a notification request for a distribution order of incoming telephone calls to the ACD apparatus 12 through the network 15 (step S1). Upon receiving the notification request through the network 15, the ACD apparatus 12 generates information about the distribution order of incoming telephone calls for the reception staff member A, who has requested the information, as incoming-call distribution order information and transmits the generated incoming-call distribution order information to the support application for the notification request installed in the reception-staff terminal (PC) 14a used by the reception staff member A, who has requested the information, through the network 15 (step S2). Upon receiving the incoming-call distribution order information, the support application in the reception-staff terminal (PC) 14a used by the reception staff member A displays the received incoming-call distribution order information in a display device provided in that reception-staff terminal (PC) 14a and thereby notifies the reception staff member A of the incoming-call distribution order information (step S3).

Meanwhile, when the reception staff member B starts up a support application for a notification request for an incoming telephone call order, which is installed in the reception-staff telephone terminal 14b of his/her reception-staff terminal 14, by operating the reception-staff telephone terminal 14b, the support application for the notification request installed in the reception-staff telephone terminal 14b transmits a notification request for a distribution order of incoming telephone calls, which is addressed to the ACD apparatus 12, to the electronic private branch exchange 11 through the network 15 (step S4). Upon receiving the notification request through the network 15, the electronic private branch exchange 11 transfers the notification request to the ACD apparatus 12, which is the destination of the notification request (step S5).

Upon receiving the notification request from the reception staff member B, which has been transferred through the network 15 and the electronic private branch exchange 11, the ACD apparatus 12 generates information about the distribution order of incoming telephone calls for the reception staff member B, who has requested the information, as incoming-call distribution order information and transmits the generated incoming-call distribution order information to the electronic private branch exchange 11, from which the notification request has been transferred (step S6). Upon receiving the incoming-call distribution order information from the ACD apparatus 12, the electronic private branch exchange 11 transfers the received incoming-call distribution order information to the support application for the notification request installed in the reception-staff telephone terminal 14b used by the reception staff member B, who has requested the information, through the network 15 (step S7). Upon receiving the incoming-call distribution order information, the support application in the reception-staff telephone terminal 14b used by the reception staff member B displays the received incoming-call distribution order information in a display device provided in that reception-staff telephone terminal 14b and thereby notifies the reception staff member B of the incoming-call distribution order information (step S8).

Note that the incoming-call distribution order information generated in the ACD apparatus 12 includes a reception staff member number indicating the number of reception staff members in attendance as information indicating an overall busyness situation of reception work and information about the number of reception staff members who can receive incoming calls and are waiting for incoming calls at the present time (i.e., the number of reception-staff terminals 14 that can receive incoming telephone calls at the present time) as information of a state in which they can respond to and handle incoming telephone calls at the present time, in addition to the information about the distribution order of incoming telephone calls for the reception staff members who have transmitted the notification requests (i.e., the reception staff members A and B). Therefore, a reception staff member who has visually recognized the incoming-call distribution order information displayed in the display device (e.g., the reception staff members A and B) can easily recognize the incoming telephone call order for the reception work, a congestion situation of incoming telephone calls for the reception work, and an approximate time before reception work occurs in the ACD system. Therefore, the reception staff member can preliminarily prepare for the reception work in a timely manner and improve quality of the reception work.

Further, in the explanatory diagram shown in FIG. 2, a case in which the ACD apparatus 12 generates, based on a notification request from a reception staff member (e.g., the reception staff member A or B) who is waring for an incoming telephone call, information about a distribution order of incoming telephone calls for the reception staff member, who has requested the information, as incoming-call distribution order information and transmits the generated incoming-call distribution order information to a support application installed in the reception-staff terminal 14 used by the reception staff member, who has requested the information, is explained. However, the generation of the information about the distribution order of incoming telephone calls in the ACD apparatus 12 is not limited to this example case. For example, the ACD apparatus 12 generates incoming-call distribution order information for each of the reception staff members in attendance at the present time and transmits generated incoming-call distribution order information to the support application in the reception-staff terminal 14 used by that reception staff member whenever the situation of occurrences of incoming telephone calls for the reception work or the state of the reception staff member is changed.

(Explanation of Operation in Embodiment)

Figure 3:
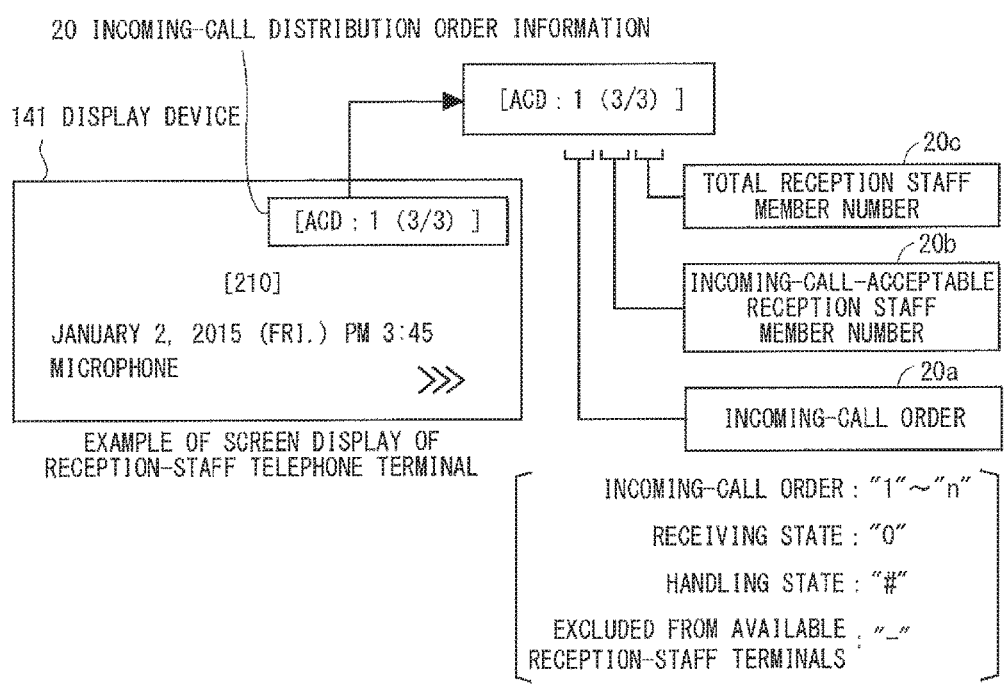
FIG. 3 is a diagram showing a screen display example of information about a distribution order of incoming telephone calls in a display device of a reception-staff telephone terminal used by a reception staff member who is waiting for an incoming telephone call in the ACD system shown in FIG. 1.
Figure 4:
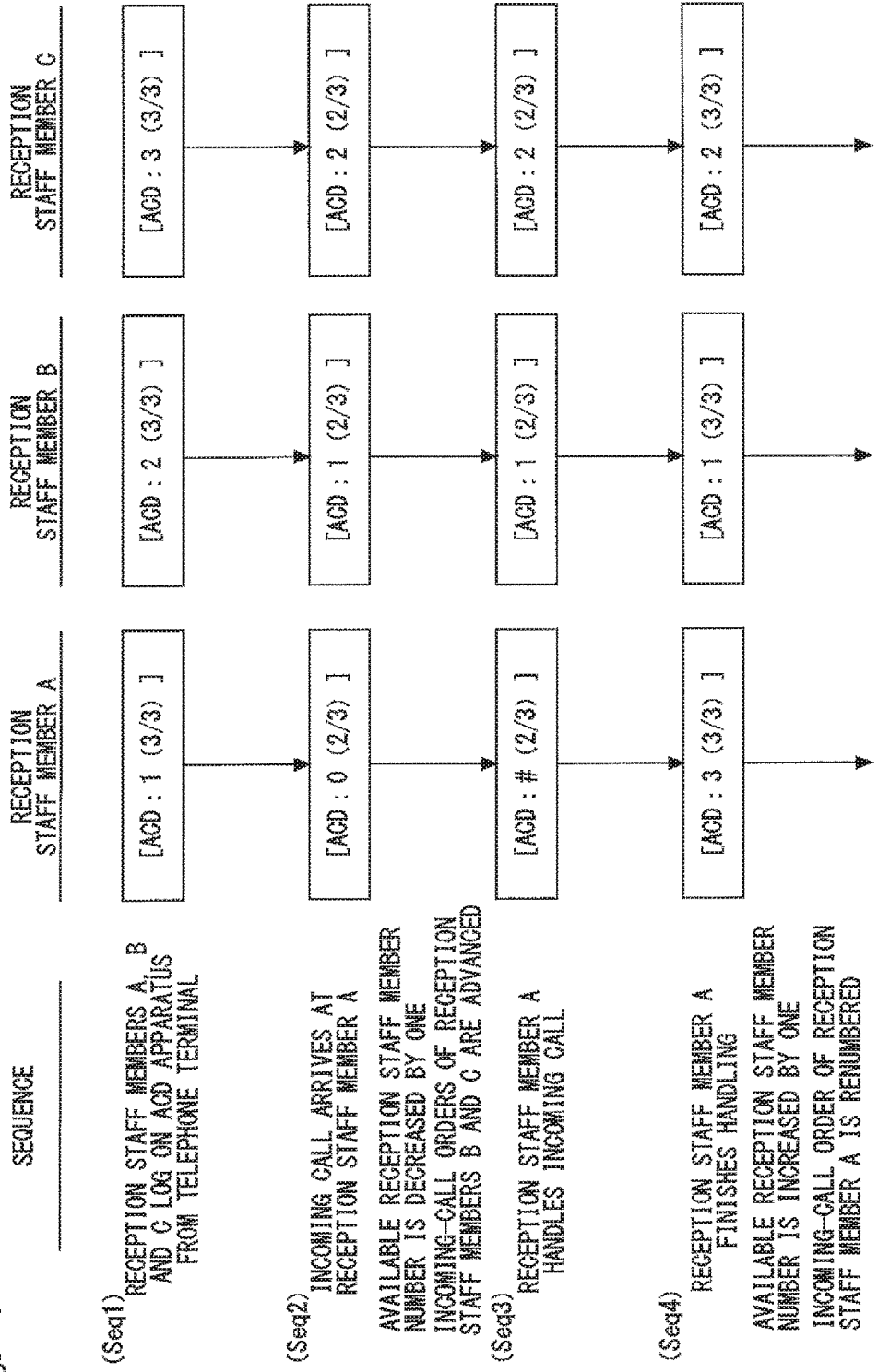
FIG. 4 is a diagram showing, when there are three reception staff members in attendance as shown in the ACD system shown in FIG. 1, a screen display example showing incoming-call distribution order information in a display device of each reception-staff terminal according to changes in a situation of occurrences of incoming telephone calls.
Figure 5:
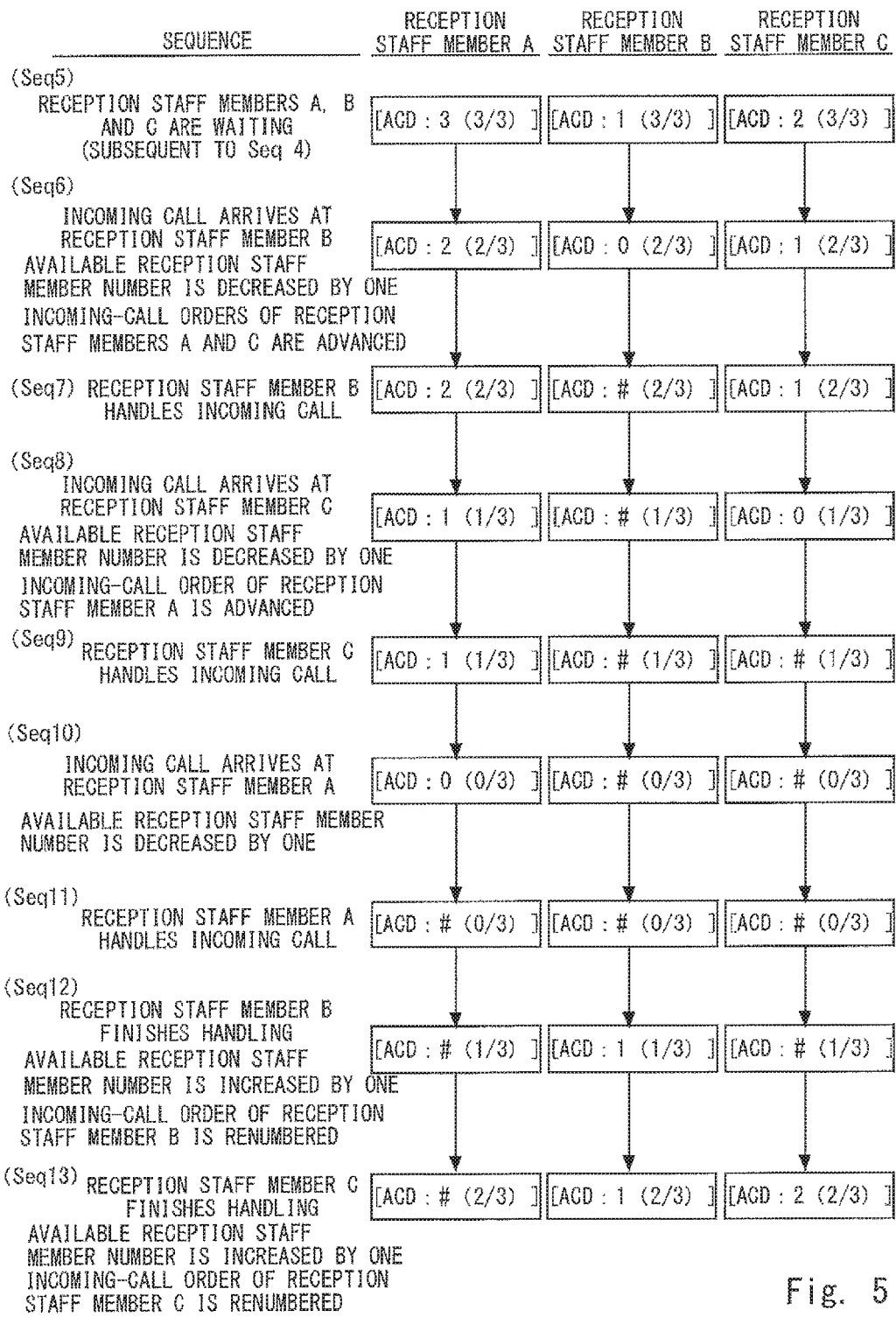
FIG. 5 is a diagram showing a screen display example showing incoming-call distribution order information in a display device of each reception-staff terminal according to changes in the situation of occurrences of incoming telephone calls subsequent to the displays shown in FIG. 4.

Next, an example of an operation performed in the ACD system according to an embodiment of the present disclosure shown in FIGS. 1 and 2 is explained in details with reference to FIGS. 3 to 5 in which examples of screen display displayed on a screen of the display device of the reception-staff terminal 14 are shown.

FIG. 3 shows a screen display example showing an example of information about a distribution order of incoming telephone calls, i.e., incoming-call distribution order information displayed on the screen of the display device 141 of the reception-staff telephone terminal 14b used by a reception staff member who is waiting for an incoming telephone call in the ACD system shown in FIG. 1. In the screen display example shown in FIG. 3, incoming-call distribution order information 20 "[ACD: 1(3/3)]" displayed as an example in an upper-right part of the screen of the display device 141 is a screen display example of information about a distribution order of incoming telephone calls that is generated in the ACD apparatus 12 and transmitted to the reception-staff telephone terminal 14b.

In the incoming-call distribution order information 20 shown in FIG. 3, the number "1" next to the "ACD:" indicates an incoming-call order 20a. That is, it indicates that, in regard to the distribution order of incoming telephone calls to respective reception staff members, the order of the reception staff member of the reception-staff telephone terminal 14b shown in FIG. 3 is the first. Further, regarding "3/3" inside the subsequent parentheses, the numerator "3" indicates the number 20b of reception staff members who can receive incoming calls, i.e., indicates that three reception staff members can receive incoming telephone calls. Further, the denominator "3" indicates the number 20c of all the reception staff members at the present time, i.e., indicates that there are three reception staff members in attendance at the present time.

Note that the incoming-call order 20a indicates, for its respective reception staff member, his/her position in the distribution order of incoming telephone calls among a plurality of reception staff members (e.g., n reception staff members) indicated by the incoming-call-acceptable reception staff member number 20b by using a natural number from "1" to "n". Further, a state in which the reception staff member is receiving an incoming telephone call is indicated by a number "0" and a state in which the reception staff member has responded to an incoming telephone call and is handling the incoming telephone call is indicated by a number "#". Further, a state in which the reception staff member cannot receive an incoming telephone call and hence is excluded from the incoming-call-available reception staff members at the present time is indicated by a number "–".

Next, screen display examples at the time when a telephone call has just been received (at the time of an ACD call-receiving operation) in a state where there are three reception staff members, i.e., the reception staff members A, B and C in attendance in the ACD system shown in FIG. 1 is further exampled with reference to FIGS. 4 and 5. FIG. 4 is a diagram showing a screen display example of information about distribution orders of incoming telephone calls, i.e., incoming-call distribution order information 20 displayed on the screens of the display devices 141 of the respective reception-staff terminals 14 according to changes in the situation of occurrences of incoming telephone calls when there are three reception staff members (the reception staff members A, B and C) in attendance in the ACD system shown in FIG. 1. FIG. 5 is a diagram showing a screen display example showing information about distribution orders of incoming telephone calls, i.e., the incoming-call distribution order information 20 displayed on the screens of the display devices 141 of the respective reception-staff terminals 14 according to changes in the situation of occurrences of incoming telephone calls subsequent to the displays shown in FIG. 4.

Firstly, in the screen display example shown in FIG. 4, when each of the three reception staff members (the reception staff members A, B and C) logs on the ACD apparatus 12 from the reception-staff telephone terminal 14b of his/her reception-staff terminal 14 through the network 15 and the electronic private branch exchange 11 (i.e., makes a notification request for information about a distribution order of incoming telephone calls), the ACD apparatus 12 generates information about a distribution order of incoming telephone calls, i.e., incoming-call distribution order information 20 for each reception staff member and transmits the generated incoming-call distribution order information 20 to the support application of the respective reception-staff telephone terminal 14b, which has requested the information. Upon receiving the incoming-call distribution order information 20, the support application of each reception-staff telephone terminal 14b, which has requested the information, displays that incoming-call distribution order information 20 on the screen of the display device 141 provided in the respective reception-staff telephone terminal 14b (sequence Seq1).

Note that the incoming-call order 20a indicated in the incoming-call distribution order information 20 that is generated by the ACD apparatus 12 and displayed on the screen is an order of the reception staff members A, B and C. Further, information pieces "[ACD: 1(3/3)]", "[ACD: 2(3/3)]", and "[ACD: 3(3/3)]" are displayed on the screens of the display devices 141 of the reception-staff telephone terminals 14b of the respective reception staff members (the reception staff members A, B and C) as shown in FIG. 4.

After that, when incoming telephone call to the ACD system occurs, the ACD apparatus 12 connects the incoming telephone call to the reception-staff telephone terminal 14b of the reception staff member A whose distribution order of incoming telephone calls is set to the first at the present time (sequence Seq2). As a result, the incoming-call order 20a in the incoming-call distribution order information 20 displayed on the screen of the display device 141 of the reception-staff telephone terminal 14b of the reception staff member A changes from the number "1" to a number "0" indicating a receiving state. Further, the incoming-call-acceptable reception staff member number 20b is decreased by one and hence changed to "2". Further, the incoming-call orders 20a in the incoming-call distribution order information 20 displayed on the screens of the display devices 141 of the reception-staff telephone terminals 14b of the reception staff members B and C are increased by one and hence changed to "1" and "2", respectively. Further, the incoming-call-acceptable reception staff member number 20b is decreased by one and hence changed to "2".

Further, after that, when the reception staff member A, who has received the incoming telephone call, operates his/her reception-staff telephone terminal 14b and thereby starts dealing with the person at the other end of the telephone call, the incoming-call order 20a in the incoming-call distribution order information 20 displayed on the screen of the display devices 141 of the reception-staff telephone terminals 14b of the reception staff member A changes from the number "0" indicating the receiving state to a symbol "#" indicating a handling state (sequence Seq3).

After that, when the reception staff member A, who is handling the telephone call, finishes the handling, the reception staff member A also becomes ready for receiving an incoming telephone call. Therefore, the incoming-call-acceptable reception staff member number 20b in the incoming-call distribution order information 20 displayed on the screen of the display device 141 of the reception-staff telephone terminal 14b of each of the reception staff members A, B and C is increased by one and hence changed to "3". Further, regarding the reception staff member A, the incoming-call order 20a changes from the symbol "#" indicating the handling state to a number "3" indicating an incoming-call order, i.e., renumbered so that the incoming-call distribution order of the reception staff member A becomes the last (sequence Seq4).

Next, referring to the screen display example shown in FIG. 5, when all of the reception staff members A, B and C become a waiting state for waiting for incoming telephone calls, the incoming-call distribution order information 20 displayed on the screen of the display device 141 of the reception-staff telephone terminal 14b of each reception staff member continue the state in the sequence Seq4 (sequence Seq5).

When an incoming telephone call to the ACD system occurs while each reception staff member is in the waiting state, the ACD apparatus 12 connects the incoming telephone call to the reception-staff telephone terminal 14b of the reception staff member B whose distribution order of incoming telephone calls is set to the first at the present time (sequence Seq6). As a result, the incoming-call order 20a in the incoming-call distribution order information 20 displayed on the screen of the display device 141 of the reception-staff telephone terminal 14b of the reception staff member B changes from the number "1" to a number "0" indicating a receiving state. Further, the incoming-call-acceptable reception staff member number 20b is decreased by one and hence changed to "2". Further, the incoming-call orders 20a in the incoming-call distribution order information 20 displayed on the screens of the display devices 141 of the reception-staff telephone terminals 14b of the reception staff members C and A are increased by one and hence changed to "1" and "2", respectively. Further, the incoming-call-acceptable reception staff member number 20b is decreased by one and hence changed to "2".

Further, after that, when the reception staff member B, who has received the incoming telephone call, operates his/her reception-staff telephone terminal 14b and thereby starts dealing with the person at the other end of the telephone call, the incoming-call order 20a in the incoming-call distribution order information 20 displayed on the screen of the display devices 141 of the reception-staff telephone terminals 14b of the reception staff member B changes from the number "0" indicating the receiving state to a symbol "#" indicating a handling state (sequence Seq7).

Next, when another incoming telephone call to the ACD system occurs, the ACD apparatus 12 connects the incoming telephone call to the reception-staff telephone terminal 14b of the reception staff member C whose distribution order of incoming telephone calls is set to the first at the present time (sequence Seq8). As a result, the incoming-call order 20a in the incoming-call distribution order information 20 displayed on the screen of the display device 141 of the reception-staff telephone terminal 14b of the reception staff member C changes from the number "1" to a number "0" indicating a receiving state. Further, the incoming-call-acceptable reception staff member number 20b is further decreased by one and hence changed to "1". Further, the incoming-call order 20a in the incoming-call distribution order information 20 displayed on the screen of the display device 141 of the reception-staff telephone terminal 14b of the reception staff member A, who can receive an incoming call, is increased by one and hence changed to "1". Further, the incoming-call-acceptable reception staff member number 20b is decreased by one and hence changed to "1". Further, the incoming-call order 20a in the incoming-call distribution order information 20 displayed on the screen of the display device 141 of the reception-staff telephone terminal 14b of the reception staff member B, who is handling the incoming telephone call, does not change from the symbol "#" indicating the handling state, but the incoming-call-acceptable reception staff member number 20b is decreased by one and hence changed to "1".

Further, after that, when the reception staff member C, who has received the incoming telephone call, operates his/her reception-staff telephone terminal 14b and thereby starts dealing with the person at the other end of the telephone call, the incoming-call order 20a in the incoming-call distribution order information 20 displayed on the screen of the display devices 141 of the reception-staff telephone terminals 14b of the reception staff member C changes from the number "0" indicating the receiving state to a symbol "#" indicating a handling state (sequence Seq9).

Next, when another incoming telephone call to the ACD system occurs, the ACD apparatus 12 connects the incoming telephone call to the reception-staff telephone terminal 14b of the reception staff member A whose distribution order of incoming telephone calls is set to the first at the present time (sequence Seq10). As a result, the incoming-call order 20a in the incoming-call distribution order information 20 displayed on the screen of the display device 141 of the reception-staff telephone terminal 14b of the reception staff member A changes from the number "1" to a number "0" indicating a receiving state. Further, the incoming-call-acceptable reception staff member number 20b is further decreased by one and hence changed to "0". Further, the incoming-call order 20a in the incoming-call distribution order information 20 displayed on the screen of the display device 141 of the reception-staff telephone terminal 14b of each of the reception staff members B and C, who are handling the incoming telephone calls, does not change from the symbol "#" indicating the handling state, but the incoming-call-acceptable reception staff member number 20b is further decreased by one and hence changed to "0".

Further, after that, when the reception staff member A, who has received the incoming telephone call, operates his/her reception-staff telephone terminal 14b and thereby starts dealing with the person at the other end of the telephone call, the incoming-call order 20a in the incoming-call distribution order information 20 displayed on the screen of the display devices 141 of the reception-staff telephone terminals 14b of the reception staff member A changes from the number "0" indicating the receiving state to a symbol "#" indicating a handling state (sequence Seq11). As described above, at the stage of the sequence Seq10, the incoming-call-available reception staff member numbers 20b in the incoming-call distribution order information 20 displayed on the screens of the display devices 141 of the reception-staff telephone terminals 14b of all the reception staff members change to the number "0" and hence indicate that it is impossible to receive an incoming telephone call any longer. Therefore, it can be understood that since all the reception staff members are busy with the reception work in the ACD system at the present time, if the next incoming telephone call occurs, that incoming telephone call is put into a waiting state.

After that, when the reception staff member B, who is handling the telephone call, finishes the handling, the reception staff member B becomes ready for receiving an incoming telephone call. Therefore, the incoming-call order 20a in the incoming-call distribution order information 20 displayed on the screen of the display device 141 of the reception-staff telephone terminal 14b of the reception staff member B changes from the symbol "#" indicating the handling state to a number "1" indicating that his/her incoming-call order is the first and the incoming-call-acceptable reception staff member number 20b is increased by one and hence changed to "1". Further, the incoming-call order 20a in the incoming-call distribution order information 20 displayed on the screen of the display device 141 of the reception-staff telephone terminal 14b of each of the reception staff members C and A does not change from the symbol "#" indicating the handling state, but the incoming-call-acceptable reception staff member number 20b is increased by one and hence changed to "1" (sequence Seq12).

Further, after that, when the reception staff member C, who is handling the telephone call, finishes the handling, the reception staff member C becomes ready for receiving an incoming telephone call subsequent to the reception staff member B. Therefore, the incoming-call order 20a in the incoming-call distribution order information 20 displayed on the screen of the display device 141 of the reception-staff telephone terminal 14b of the reception staff member C changes from the symbol "#" indicating the handling state to a number "2" indicating that his/her incoming-call order is the second and the incoming-call-acceptable reception staff member number 20b is further increased by one and hence changed to "2". Further, the incoming-call orders 20a in the incoming-call distribution order information 20 displayed on the screens of the display devices 141 of the reception-staff telephone terminals 14b of the reception staff members A and B do not change from the symbol "#" indicating the handling state and the number "1" indicating the first incoming-call order, respectively, but the incoming-call-acceptable reception staff member number 20b for each of the reception staff members A and B is further increased by one and hence changed to "2" (sequence Seq13).

(Explanation of Advantageous Effect of Embodiment)

As explained above in detail, an ACD system according to an embodiment of the present disclosure can provide the following advantageous effects.

By a notification of incoming-call distribution order information 20 sent from the ACD apparatus 12 to each reception staff member (i.e., information about a distribution order of incoming telephone calls sent to each reception staff member), each reception staff member who is waiting for an incoming telephone call for reception work can check a grace period before the next reception work starts. That is, as described previously, the incoming-call-acceptable reception staff member number 20b and the total reception staff member number 20c in addition to the incoming-call order 20a are sent as the incoming-call distribution order information 20 to each reception staff member who is waiting for an incoming telephone call for reception work. Therefore, compared to the related-art problematic reception work that is triggered by a sudden incoming call to a reception-staff telephone terminal, each reception staff member can easily check an overall busyness situation of the reception work in the ACD system (whether or not there is any remaining reception staff member who can receive an incoming call) and estimate a time before the next reception work starts. As a result, the reception staff member can efficiently prepare for the reception work and carry out other work.

Configurations of preferable embodiments according to the present disclosure have been explained above. However, it should be noted that the above-shown embodiments are merely examples of the present disclosure and thus do not limit the present disclosure. It will be understood by those of ordinary skill in the art that various changes in form and details may be made to the embodiments without departing from the spirit and scope of the present disclosure.

Although the present disclosure is described as a hardware configuration in the above-described embodiments, the present disclosure is not limited to the hardware configurations. In the present disclosure, arbitrary processing can be also implemented by causing a CPU (Central Processing Unit) to execute a computer program.

The aforementioned program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present disclosure is explained above with reference to embodiments, the present disclosure is not limited to the above-described embodiments. Various modifications that can be understood by those skilled in the art can be made to the configuration and details of the present disclosure within the scope of the present disclosure.

REFERENCE SIGNS LIST

11 ELECTRONIC PRIVATE BRANCH EXCHANGE
12 ACD APPARATUS
13 SUPERVISOR TERMINAL
13a SUPERVISOR TERMINAL (PC)
13b SUPERVISOR TELEPHONE TERMINAL
14 RECEPTION-STAFF TERMINAL
14a RECEPTION-STAFF TERMINAL (PC)
14b RECEPTION-STAFF TELEPHONE TERMINAL
15 NETWORK
20 INCOMING-CALL DISTRIBUTION ORDER INFORMATION
20a INCOMING-CALL ORDER
20b INCOMING-CALL-AVAILABLE RECEPTION STAFF MEMBER NUMBER
20c TOTAL RECEPTION STAFF MEMBER NUMBER
141 DISPLAY DEVICE

The invention claimed is:

1. An ACD system comprising one or a plurality of reception-staff terminals used by one or a plurality of respective reception staff members each of whom receives an incoming telephone call for reception work, an ACD (Auto Call Distribution) apparatus configured to automatically assign the incoming telephone call to an arbitrary reception-staff terminal, and a network configured to connect each reception-staff terminal with the ACD apparatus, wherein
when the ACD apparatus receives a notification request for information about a distribution order of the incoming telephone call from the reception-staff terminal that is waiting for the incoming telephone call through the network,
the ACD apparatus generates incoming-call distribution order information indicating an incoming-call order of the incoming telephone call for the reception-staff terminal that has made the notification request, and transmits the generated incoming-call distribution order information to the reception-staff terminal that has made the notification request through the network,
the reception-staff terminal that has made the notification request and received the incoming-call distribution order information displays the received incoming-call distribution order information on a screen of a display device, wherein:
each of the reception-staff terminals comprises a reception-staff PC terminal equipped with a data processing function and a reception-staff telephone terminal equipped with a telephone-call sending/receiving function and a telephone conversation function; the ACD system further comprising a private branch exchange disposed between the network and the ACD apparatus, the private branch exchange being capable of transferring information to the ACD apparatus in order to transmit/receive the information between the reception-staff telephone terminal and the ACD apparatus through the network; the reception-staff terminal being able to transmit the notification request from either the reception-staff PC terminal or the reception-staff telephone terminal to the ACD apparatus through the network when the reception-staff terminal is waiting for the incoming telephone call; and the ACD apparatus transmits the incoming-call distribution order information generated by the ACD apparatus to either the reception-staff PC terminal or the reception-staff telephone terminal that has transmitted the notification request through the network, and
when the reception-staff terminal transmits the notification request from the reception-staff PC terminal thereof, the reception-staff terminal directly transmits the notification request to the ACD apparatus through the network and the ACD apparatus transmits the incoming-call distribution order information generated by the ACD apparatus to the reception-staff PC terminal that has transmitted the notification request through the network; whereas when the reception-staff terminal transmits the notification request from the reception-staff telephone terminal thereof, the reception-staff terminal transmits the notification request to the ACD apparatus through the network and the private branch exchange, and the ACD apparatus transmits the incoming-call distribution order information generated by the ACD apparatus to the reception-staff telephone terminal that has transmitted the notification request through the private branch exchange and the network.

2. The ACD system according to claim 1, wherein the incoming-call distribution order information is information including not only information about the distribution order of incoming telephone calls to the reception-staff terminals but also information about a reception staff member number indicating the number of reception staff members in attendance and an incoming-call-available reception staff member number indicating the number of reception staff members who can respond to and handle incoming telephone calls.

3. The ACD system according to claim 1, wherein the ACD apparatus generates the incoming-call distribution order information about each of the reception-staff terminals and transmits the generated incoming-call distribution order information to each of respective reception-staff terminals whenever a change in an incoming-call situation for the incoming telephone calls or a change in a state of each reception-staff terminal occurs, as well as when the ACD apparatus receives a notification request for information about the distribution order of incoming telephone calls from the reception-staff terminal that is waiting for the incoming telephone call.

4. An incoming-call order notification method used in an ACD system comprising one or a plurality of reception-staff terminals used by one or a plurality of respective reception staff members each of whom receives an incoming telephone call for reception work, an ACD (Auto Call Distribution) apparatus configured to automatically assign the incoming telephone call to an arbitrary reception-staff terminal, and a network configured to connect each reception-staff terminal with the ACD apparatus, wherein when a notification request for information about a distribution order of the incoming telephone call is sent from the reception-staff terminal that is waiting for the incoming telephone call to the ACD apparatus through the network, the ACD apparatus generates incoming-call distribution order information indicating an incoming-call order of the incoming telephone call for the reception-staff terminal that has sent the notification request, and transmits the generated incoming-call distribution order information to the reception-staff terminal that has sent the notification request through the network, when the reception-staff terminal that has sent the notification request receives the incoming-call distribution order information, the reception-staff terminal displays the received incoming-call distribution order information on a screen of a display device and thereby notifies a reception staff member in charge of the reception-staff terminal of the incoming-call distribution order information, wherein:

each of the reception-staff terminals comprises a reception-staff PC terminal equipped with a data processing function and a reception-staff telephone terminal equipped with a telephone-call sending/receiving function and a telephone conversation function; the ACD system further comprising a private branch exchange disposed between the network and the ACD apparatus, the private branch exchange being capable of transferring information to the ACD apparatus in order to transmit/receive the information between the reception-staff telephone terminal and the ACD apparatus through the network; the incoming-call order notification method enables the reception-staff terminal to transmit the notification request from either the reception-staff PC terminal or the reception-staff telephone terminal to the ACD apparatus through the network when the reception-staff terminal is waiting for the incoming telephone call; and the incoming-call order notification method enables the ACD apparatus to transmit the incoming-call distribution order information generated by the ACD apparatus to either the reception-staff PC terminal or the reception-staff telephone terminal that has transmitted the notification request through the network, and when the reception-staff terminal transmits the notification request from the reception-staff PC terminal thereof, the reception-staff terminal directly transmits the notification request to the ACD apparatus through the network and the ACD apparatus transmits the incoming-call distribution order information generated by the ACD apparatus to the reception-staff PC terminal that has transmitted the notification request through the network; whereas when the reception-staff terminal transmits the notification request from the reception-staff telephone terminal thereof, the reception-staff terminal transmits the notification request to the ACD apparatus through the network and the private branch exchange, and the ACD apparatus transmits the incoming-call distribution order information generated by the ACD apparatus to the reception-staff telephone terminal that has transmitted the notification request through the private branch exchange and the network.

5. The incoming-call order notification method according to claim 4, wherein the incoming-call distribution order information is information including not only information about the distribution order of incoming telephone calls to the reception-staff terminals but also information about a reception staff member number indicating the number of reception staff members in attendance and an incoming-call-available reception staff member number indicating the number of reception staff members who can respond to and handle incoming telephone calls.

6. The incoming-call order notification method according to claim 4, wherein the ACD apparatus generates the incoming-call distribution order information about each of the reception-staff terminals and transmits the generated incoming-call distribution order information to each of respective reception-staff terminals whenever a change in an incoming-call situation for the incoming telephone calls or a change in a state of each reception-staff terminal occurs, as well as when the ACD apparatus receives a notification request for information about the distribution order of incoming telephone calls from the reception-staff terminal that is waiting for the incoming telephone call.

7. A non-transitory computer readable medium storing an incoming-call order notification program, the incoming-call order notification program being adapted to implement an incoming-call order notification method according to claim 4 as a computer executable program.

* * * * *